Patented Jan. 20, 1953

2,626,285

UNITED STATES PATENT OFFICE 2,626,285

RECOVERY OF CYCLOPENTADIENE

William D. Spaulding, Steubenville, Ohio, and Bernard K. Wasserkrug, Weirton, W. Va., assignors to National Steel Corporation, a corporation of Delaware No Drawing. Application January 30, 1950, Serial No. 141,354

15 Claims. (Cl. 260—666)

1

This invention relates to an improved process for recovering cyclopentadiene from light oil fractions from coke oven by-product plants.

This application is a continuation-in-part of our application Serial No. 481,160 filed March 30, 1943, now abandoned, and entitled "Recovery of Cyclopentadiene."

In conventional operation, light oil recovered in the rectifier of the wash oil still is further rectified to remove as overhead, carbon disulphide and other vapors including cyclopentadiene, light paraffins and unsaturates. The bottoms, namely, benzene, toluene and xylene are given further treatment to separate the components. The overhead, including the cyclopentadiene, is normally subjected to a condensation step to form forerunnings or a reflux liquid for controlling the temperature at the top of the rectifying column. In order to recover the cyclopentadiene it has been proposed to collect excess condensate and pass this liquid to a polymerization process in which the liquid is heated under certain conditions to polymerize the cyclopentadiene to dicyclopentadiene. The dicyclopentadiene is separated from the liquid mixture by distillation at reduced pressure. Depolymerization of the resulting dimer is accomplished by heating the dicyclopentadiene to an elevated temperature.

We have discovered a new process for recovering cyclopentadiene in which a vapor phase polymerization step is used. In the improved process we take the light fraction of coke oven by-product light oil, either as overhead vapor or as forerunnings liquid or refluxing liquid and pass the light fraction into a polymerization zone where the cyclopentadiene is polymerized to dicyclopentadiene in vapor phase. The dicyclopentadiene is collected and may be depolymerized by heating if desired.

It will be apparent that the present process incorporates many advantages. As will be pointed out hereinafter, a much more rapid polymerization takes place than in those processes known in the prior art. The nature of the present process makes it possible to continuously withdraw the light fraction, either in vapor or liquid form and continuously polymerize the withdrawn material so as to avoid the batch process in which condensate is collected and stored and then polymerized in liquid phase by the batch process. Vapor phase polymerization can be continuous where liquid phase polymerization is an intermittent batch process. In addition, heating under reduced pressure to separate the remainder of the liquid from the dimer can be avoided.

2

An important object of the present invention is to provide an improved process for the recovery of cyclopentadiene from coke oven by-product light oil fractions untilizing vapor phase polymerization. Other objects and advantages of the present invention will readily appear from the following description.

When the coke oven gas is scrubbed with wash oil a minor amount of cyclopentadiene is absorbed together with other hydrocarbons. When the rich wash oil is subjected to a stripping action, the vapors evolved include vapors of xylene, toluene, benzene, carbon disulphide, the cyclopentadiene referred to, and additional light paraffins and unsaturated hydrocarbons. Rectification of these vapors removes some of the lightest hydrocarbons and in usual practice gives a condensate, termed light oil. This light oil is distilled with refluxing and the higher boiling constituents, or bottoms, namely, benzene, toluene and xylene are withdrawn from the still. As a result of this factional distillation, a light fraction of the light oil is distilled off in vapor form. This light fraction is commonly referred to as overhead when in vapor form and is commonly referred to as forerunnings or reflux when in liquid form. The light fraction contains carbon disulphide, cyclopentadiene, light paraffins and unsaturates. The boiling point of carbon disulphide is about 115° F. and the boiling point of cyclopentadiene is about 106° F. Generally this overhead is passed to a condenser wherein those components of the overhead boiling in the vicinity of 104° F. or above are condensed and the resulting liquid is recycled back to the top of the rectifying column to control the top temperature. Excess overhead vapor is discharged to the fuel gas lines.

Instead of venting excess vapors from the reflux condenser to fuel gas lines as is now the practice, the present invention contemplates the withdrawal of all or part of the light fraction of the light oil and its introduction to a vapor phase polymerization step. The overhead is preferably withdrawn in vapor form but condensate may be withdrawn and vaporized. Where refluxing liquid is withdrawn it may be vaporized in a preliminary vaporization step or the liquid may be introduced into a polymerization zone where the relatively high temperature will immediately vaporize it. Preferably, the overhead vapors themselves are introduced directly into the polymerization zone without the intermediate condensation step. We have carried out the process by allowing a volume of the refluxing liquid to be sprayed into a polymerization chamber where it was immediately vaporized. This chamber was maintained at different temperatures. We varied the temperature of this polymerization chamber from 302° F. to 527° F. with good results. Under these conditions the chamber was maintained at about atmospheric pressure. Other temperatures may be used in this polymerization zone such as those temperatures used when passing the overhead vapors directly to the polymerization zone as more fully hereinafter described.

The effluent of the polymerization chamber was passed to a condensation chamber, the temperature of which was varied from 77° F. to 212° F., the pressure being maintained at atmospheric pressure. Since the reflux liquid had a boiling point in the vicinity of 104° F. a temperature of 122° F. in the condenser would theoretically pass all unchanged products; on the other hand, the dimer, dicyclopentadiene, which has a boiling point of 338° F. would be condensed. We found in our work however, that a temperature in the condenser of from 77° F. to 122° F. gave satisfactory separation of the dimer from the other components of the vapor. This is thought to be due to the inefficiency of the condenser used and the entrainment of dicyclopentadiene. Actually, as brought out above, the vapors passing into the condensing zone cannot be lowered to a temperature below about 115° F. without condensing relatively large quantities of other materials. The temperature of the vapors in the condensation step may have an upper limit anywhere below 338° F.

We found best results in the polymerization zone were obtained by raising the vapors to a temperature of about 482° F. This optimum temperature was for the particular conditions under test. Five hundred cc. of liquid reflux containing about 45% cyclopentadiene were vaporized in 13 minutes in a polymerization chamber 340 cm. long with an average cross section of .264 cm.$^2$. The pressure was around atmospheric. It will be understood that with different concentrations of cyclopentadiene in the vapor being treated and with different rates of flow through the polymerization zone, other optimum temperatures can readily be found. The rate of polymerization increases with increase in temperature, but when the temperature is raised too high the reaction time must be drastically reduced to prevent polymerization of the dicyclopentadiene to the higher polymers.

It is estimated that under the optimum conditions of polymerization and condensation the yield of technical dicyclopentadiene obtained from the reflux liquid was approximately 40%. Of this yield approximately 85% was dicyclopentadiene, but with more efficient condensation the yield can be raised much higher.

We prefer to pass the light fraction of the light oil from the coke oven by-product recovery plant continuously and directly to a polymerization zone without first condensing this fraction or a portion of this fraction. The liquid fraction can be continuously removed from the condenser and passed continuously to the polymerization zone. The light fraction is continuously flowed through the polymerization zone and heated to an elevated temperature above 275° F. and the cyclopentadiene is polymerized to dicyclopentadiene. Preferably, the vapor is heated to above 500° F. in the polymerization zone. The temperature may vary over a very wide range. The time required to effect polymerization is quite short. The time varies with the temperature so that the higher the temperature, the shorter the polymerization period and vice versa. Particularly at the higher temperatures, the time during which the vapors are heated must be reduced or there is a tendency for higher polymers to be found. Temperatures of from 275° F. to 1160° F. have been successfully used in the polymerization zone and the vapor may be heated to 1200° F., or higher, to effect polymerization. It is somewhat surprising that such temperatures can be used because at temperatures above about the boiling point of dicyclopentadiene, dicyclopentadiene is supposed to break down to the monomer. At least with other gases present in the light fraction of the light oil, it has been found that polymerization can be carried out at temperatures far above the boiling point of dicyclopentadiene. In addition, it has been found that polymerization can be effected in a relatively short time at relatively low temperatures. We prefer to use a temperature above 500° F. in the polymerization zone as a higher yield is obtained at these higher temperatures. While increasing the time does increase the amount of monomer polymerized to the dimer, too great an increase in time tends to cause polymerization to higher polymers. Accordingly, higher yields are obtained at the higher temperatures. Where combustible gaseous mixtures may come into contact with the exterior of the polymerization apparatus it is preferred to use a temperature not above about 750° F. so as to reduce the explosive hazard. If polymerization is carried out under conditions such that there is no chance of explosions occurring then the higher temperatures may be used.

In the following examples, overhead vapors were withdrawn from the coke oven by-product plant and the overhead in vapor phase was passed through a polymerization chamber about 3 inches in diameter and 35 inches long. The chamber was filled with ceramic saddles so that the gas flowed through the chamber and across surfaces in a thin film. It was estimated that there was 13 square feet of surface area in the polymerization zone and that the free volume was about 0.1121 cubic foot. This arrangement was used so that the film of vapor would be more quickly and uniformly heated. The gas flowed continuously so that relatively cool overhead gas was continuously flowed into the polymerization chamber at the inlet end and relatively hot effluent gas containing dicyclopentadiene was continuously flowed out of the chamber at the outlet end. The temperature of the vapors in the polymerization zone varied along the length of the zone, partially as a result of the cooling effect of the incoming gas and these temperatures were determined at three points, point A being 3½ inches from the inlet end, point C being 3½ inches from the outlet end and point B being substantially midway between points A and C.

A sample of the overhead vapors was condensed and this sample was found to contain about 33% by weight of cyclopentadiene. This value was used for calculating the amount of cyclopentadiene subjected to polymerization and the percentage yield. The percentage of cyclopentadiene varied from time to time but this did not apparently make an appreciable difference in the polymerization reaction. As a result of the practical difficulties involved in collecting the sample of overhead, only one sample was collected.

| | Examples | | | | | | | | |
|---|---|---|---|---|---|---|---|---|---|
| | A | B | C | D | E | F | G | H | I |
| Average Gas Temperature at Degree F.: | | | | | | | | | |
| Inlet | 90 | 90 | 95 | 90 | 95 | 90 | 125 | 125 | 135 |
| Point A | 200 | 210 | 313 | 275 | 440 | 425 | 523 | 495 | 635 |
| Point B | 280 | 302 | 503 | 500 | 810 | 808 | 985 | 988 | 1025 |
| Point C | 275 | 235 | 460 | 378 | 533 | 588 | 728 | 795 | 613 |
| Average Gas Flow in Cubic Feet per Minute | .708 | .500 | .500 | .710 | .500 | .708 | .708 | .708 | .500 |
| Total Flow, Cubic Feet | 33.98 | 28.5 | 26.00 | 35.56 | 25.00 | 31.15 | 17.70 | 31.86 | 19.00 |
| Calculated: | | | | | | | | | |
| Time in Polymerization Zone in Seconds | 12.73 | 18.03 | 18.03 | 12.69 | 18.03 | 12.73 | 12.73 | 12.73 | 18.03 |
| Weight in Grams of Monomer Treated | 550.5 | 462.5 | 421.5 | 576.0 | 405.5 | 505.0 | 287.0 | 516.5 | 308.0 |
| Total Grams of Monomer Obtained as Dimer | 195 | 179.7 | 167.8 | 227.8 | 216.2 | 255.7 | 250 | 386.2 | 209.7 |
| Percent polymerized | 35.4 | 38.8 | 39.8 | 39.5 | 53.4 | 50.6 | 87.1 | 74.8 | 68.0 |

In the examples the time is proportional to the rate of flow. Each example was carried out over a period long enough to assure fairly stable conditions. The polymerization of cyclopentadiene to dicyclopentadiene was good at all of the above temperatures and there was no substantial polymerization of cyclopentadiene to polymers higher than dicyclopentadiene.

The effluent from the polymerization zone was passed through a series of condensers. In the first condenser the effluent was cooled to below the boiling point of dicyclopentadiene but as a result of entrainment, a considerable quantity of the dimer was carried past this first condenser and over to the other condensers. In order to obtain an indication of the amount of the cyclopentadiene polymerized, an attempt was made to collect all of the condensate over a period and the amount of dicyclopentadiene was determined. This only gave an approximation of the percentage of cyclopentadiene polymerized as the percentage of cyclopentadiene in the overhead varied from time to time and as some effluent passed through all of the condensers and carried off some entrained dimer. As a result of these errors, the percentage of cyclopentadiene polymerized was on the low side. Despite this, it was found that up to 87% of the theoretical quantity of cyclopentadiene was collected as dicyclopentadiene.

The liquid condensate was found to contain some materials having an apparent boiling point between that of carbon disulphide and dicyclopentadiene. Possibly, some chemical reactions other than the polymerization of cyclopentadiene to dicyclopentadiene took place in the polymerization zone. It may be that the condensate forms a zeotropic mixtures or it may be that some of the unsaturates, such as amylenes, enter into a reaction. Surprisingly, this does not prevent polymerization of the cyclopentadiene and may aid the polymerization of cyclopentadiene because polymerization of the cyclopentadiene does take place satisfactorily at temperatures far above those at which dicyclopentadiene breaks down to the monomer.

Substantially all of the effluent gas from the polymerization zone may be collected and the dicyclopentadiene separated by distillation under atmospheric pressure, but preferably under vacuum, or the dicyclopentadiene or a dicyclopentadiene rich fraction may be selectively condensed from the effluent. The dicyclopentadiene after collection may be depolymerized to the monomer.

All of the light fraction may be withdrawn continuously from the coke oven by-product recovery plant, either in vapor or liquid form, and the entire light fraction continuously subjected to vapor phase polymerization. The dicyclopentadiene or a dicyclopentadiene rich fraction is then separated from the effluent from the polymerization zone and all or part of the remainder of the effluent continuously returned in liquid form to the light oil still as reflux liquid. If the effluent from the polymerization zone is condensed and the dicyclopentadiene separated by distillation, then the effluent from this distillation treatment is condensed and recycled to the light oil still. If the dicyclopentadiene or a dicyclopentadiene containing fraction is condensed from the effluent, then the remaining vapors may be condensed and recycled to the light oil still. With either procedure, the dimer is separated from the effluent from the polymerization zone and all or part of the remainder of the effluent is recycled to the light oil still. Subjecting all of the light fraction to vapor phase polymerization treatment has an important advantage in that all of the cyclopentadiene is subjected to a polymerization treatment and the cyclopentadiene which is not polymerized is recycled to the light oil still and thereafter recycled through the polymerization zone. With this procedure, the polymerization of the cyclopentadiene may be relatively less efficient and still be practical as the non-polymerized cyclopentadiene repeatedly passes through the polymerization zone.

A very important, commercially practical advantage of the present invention resides in the fact that the light fraction can be continuously withdrawn from the by-product plant and rapidly and continuously polymerized in vapor phase as distinguished from the relatively slower batch process of liquid phase polymerization. The light fraction of the light oil may be withdrawn, either as overhead vapor or as condensate liquid depending on which is the easiest procedure for the particular by-product recovery plant. With either procedure of withdrawal, the process is continuous or substantially continuous and the large storage facilities that are required when polymerization is effected by the batch process in liquid phase are not required when effecting polymerization in the vapor phase.

We claim:

1. A process for separating cyclopentadiene from coke oven by-product light oil fractions containing the same comprising passing the fractions into a polymerization zone, maintaining the fractions in vapor phase in the polymerization zone at a reaction temperature between about 302° F. and about 527° F. and under a pressure in the neighborhood of atmospheric pressure, maintaining the vapors at reaction temperature for a time sufficient to polymerize cyclopentadiene to dicyclopentadiene but insufficient to cause substantial polymerization of the dicyclopentadiene to higher polymers, passing the effluent of the polymerization zone to a condensation zone wherein the effluent is reduced to a temperature below 338° F. but above 115° F. to condense the dicyclopentadiene and collecting the liquid dicyclopentadiene.

2. A process for separating cyclopentadiene from a coke oven by-product light oil fraction containing the same comprising passing the fraction into a polymerization zone, maintaining the fraction in vapor phase in the polymerization zone at a reaction temperature between about 275° F. and 1160° F. and under a pressure in the neighborhood of atmospheric pressure, maintaining the vapor at reaction temperature for a time sufficient to polymerize cyclopentadiene to dicyclopentadiene but insufficient to cause substantial polymerization of the dicyclopentadiene to higher polymers, continuously passing the effluent from the polymerization zone and then separating the dicyclopentadiene from the effluent.

3. A process for separating cyclopentadiene from a coke oven by-product light oil fraction containing the same as set forth in claim 2 wherein the fraction is maintained at a temperature above 500° F. in the polymerization zone.

4. A process for separating cyclopentadiene from a coke oven by-product light oil fraction containing the same as set forth in claim 2 wherein the fraction is maintained at a temperature between 500° F. and 750° F. in the polymerization zone.

5. A process for separating cyclopentadiene from a coke oven by-product light oil fraction containing the same comprising passing the fraction into a polymerization zone, maintaining the fraction in vapor phase in the polymerization zone at a reaction temperature between about 275° F. and about 1160° F. and under a pressure in the neighborhood of atmospheric pressure, maintaining the vapor at reaction temperature for a time sufficient to polymerize cyclopentadiene to dicyclopentadiene but insufficient to cause substantial polymerization of the dicyclopentadiene to higher polymers, continuously passing the effluent from the polymerization zone to a condensation zone wherein the effluent is reduced to a temperature below 338° F. but above 115° F. to condense the dicyclopentadiene and collecting the liquid dicyclopentadiene.

6. A process for separating cyclopentadiene from a coke oven by-product light oil fraction containing the same as set forth in claim 5 wherein the fraction is maintained at a temperature above 500° F. in the polymerization zone.

7. A process for separating cyclopentadiene from a coke oven by-product light oil fraction containing the same as set forth in claim 5 wherein the fraction is maintained at a temperature between 500° F. and 750° F. in the polymerization zone.

8. A process for continuously separating cyclopentadiene from a light fraction produced in a light oil still of a coke oven by-product plant comprising continuously passing said light fraction containing cyclopentadiene from the by-product plant into a polymerization zone, maintaining the fraction in vapor phase in the polymerization zone at a reaction temperature between about 275° F. and about 1160° F. and under a pressure in the neighborhood of atmospheric pressure, maintaining the vapor at reaction temperature for a time sufficient to polymerize cyclopentadiene to dicyclopentadiene but insufficient to cause substantial polymerization of the dicyclopentadiene to higher polymers, continuously passing the effluent from the polymerization zone, thereafter separating dicyclopentadiene from the effluent and then returning at least a portion of the effluent to the light oil still of the by-product plant.

9. A process of continuously separating cyclopentadiene from a light fraction produced in a light oil still of a coke oven by-product plant as set forth in claim 8 wherein the dicyclopentadiene is separated from the effluent by passing the effluent to a condensation zone wherein the effluent is reduced to a temperature below 338° F. but above 115° F. to condense dicyclopentadiene from the effluent and collecting the liquid dicyclopentadiene.

10. A process of continuously separating cyclopentadiene from a light fraction produced in a light oil still of a coke oven by-product plant as set forth in claim 9 wherein the fraction is heated to a temperature above 500° F. in the polymerization zone.

11. A process of continuously separating cyclopentadiene from a light fraction produced in a light oil still of a coke oven by-product plant as claimed in claim 10 wherein the fraction is maintained at a temperature below 750° F. in the polymerization zone.

12. A process of continuously separating cyclopentadiene from a light fraction produced in a light oil still of a coke oven by-product plant as set forth in claim 8 wherein the light fraction is continuously passed from the plant in the vapor phase.

13. A process of continuously separating cyclopentadiene from a light fraction produced in a light oil still of a coke oven by-product plant as set forth in claim 8 wherein the light fraction is continuously passed from the plant in the liquid phase.

14. A process of continuously separating cyclopentadiene from a light fraction produced in a light oil still of a coke oven by-product plant as set forth in claim 8 wherein the light fraction is maintained at a temperature above 500° F. in the polymerization zone.

15. A process of continuously separating cyclopentadiene from a light fraction produced in a light oil still of a coke oven by-product plant as set forth in claim 8 wherein the light fraction is maintained at a temperature between 500° F. and 750° F. in the polymerization zone.

WM. D. SPAULDING.
BERNARD K. WASSERKRUG.

REFERENCES CITED

The following references are of record in the file of this patent:

UNITED STATES PATENTS

| Number | Name | Date |
|---|---|---|
| 2,211,038 | Ward | Aug. 13, 1940 |
| 2,349,047 | Lycon et al. | May 16, 1944 |
| 2,349,418 | Glowacki et al. | May 23, 1944 |

OTHER REFERENCES

Harkness et al., Journal Chem. Physics, vol. 5, 684–5 (1937).